United States Patent
Witbrock et al.

(10) Patent No.: US 6,581,057 B1
(45) Date of Patent: Jun. 17, 2003

(54) METHOD AND APPARATUS FOR RAPIDLY PRODUCING DOCUMENT SUMMARIES AND DOCUMENT BROWSING AIDS

(75) Inventors: Michael J. Witbrock, Newton, MA (US); Mark Kantrowitz, Pittsburgh, PA (US); Vibhu O. Mittal, Pittsburgh, PA (US)

(73) Assignee: Justsystem Corporation, Tokushima (JP)

( * ) Notice: Subject to any disclaimer, the term of this patent is extended or adjusted under 35 U.S.C. 154(b) by 0 days.

(21) Appl. No.: 09/567,697

(22) Filed: May 9, 2000

(51) Int. Cl.⁷ .......................... G06F 17/30; G06F 17/21
(52) U.S. Cl. ................................. 707/5; 707/531
(58) Field of Search ........................ 707/1–5, 501.1, 707/500, 530, 531

(56) References Cited

U.S. PATENT DOCUMENTS

| | | | |
|---|---|---|---|
| 4,417,322 A | 11/1983 | Berry et al. | 364/900 |
| 4,712,174 A | 12/1987 | Minkler, II | 364/200 |
| 5,050,071 A | 9/1991 | Harris et al. | 364/200 |
| 5,077,668 A | 12/1991 | Doi | 364/419 |
| 5,297,027 A | 3/1994 | Morimoto et al. | 364/419.19 |
| 5,384,703 A | 1/1995 | Withgott et al. | 364/419.19 |
| 5,491,760 A | 2/1996 | Withgott et al. | 382/203 |
| 5,638,543 A | 6/1997 | Pedersen et al. | 395/751 |
| 5,689,716 A | 11/1997 | Chen | 395/761 |
| 5,708,825 A * | 1/1998 | Sotomayor | 707/501.1 |
| 5,748,954 A | 5/1998 | Mauldin | 395/610 |
| 5,774,109 A | 6/1998 | Winksy et al. | 345/124 |
| 5,778,397 A | 7/1998 | Kupiec et al. | 707/500 |
| 5,838,323 A | 11/1998 | Rose et al. | 345/349 |
| 6,009,442 A | 12/1999 | Chen et al. | 707/522 |

OTHER PUBLICATIONS

Anastasios Tombros and Mark Sanderson; Advantages of Query Biased Summaries in Information Retrieval, Proceedings of the 21$^{st}$ Annual International ACM SIGIR Conference on Research and Development in Information Retrieval; Aug. 24–28, 1998; pp. 2–10.

Intelligent Document Retrieval, IBM Technical Disclosure Bulletin, Jun. 1, 1991, vol. 34, No. 5, pp. 403–405.

* cited by examiner

Primary Examiner—Jack Choules
(74) Attorney, Agent, or Firm—Webb Ziesenheim Logsdon Orkin & Hanson, P.C.

(57) ABSTRACT

Disclosed is a computer-assisted method for generating a summary of or a browsing aid for a document. At an index creation time, information that is relevant to at least one dummy query and is necessary to compile at least one temporary summary for the summary or browsing aid is extracted from a document and cached for later use. The information may be compiled into the summary and saved as such. At a search time, the summary or browsing aid is generated using the information that was cached at index creation time. An apparatus for performing this computer-assisted method is also disclosed.

37 Claims, 8 Drawing Sheets

METHOD AND APPARATUS FOR RAPIDLY PRODUCING DOCUMENT SUMMARIES AND DOCUMENT BROWSING AIDS

BACKGROUND OF THE INVENTION

1. Field of the Invention

This invention relates to computer-assisted information storage and retrieval and, more particularly, to producing document summaries and document browsing aids.

2. Description of the Prior Art

As part of search results corresponding to a user query, for example, in an information retrieval system, a query-biased summary generation system provides a document summary that incorporates sentences, sentence fragments, or text spans that are relevant to the user query. The full text of the document must be available in order to create the query-biased summary. Usually, the summary includes the sentences having the greatest number of user query terms that appear most frequently. The summary can also include sentences that are closely related to the query by incorporating synonyms of the query terms into the criteria for the selection of the included sentences. With the current state of the art, the generation of a query-biased summary requires significant processing time.

Current information retrieval systems and information management systems, such as web catalogs, search engines, and document indexes, do not use query-biased summaries. Topical document summaries that are relevant to the user query are not provided. Instead, for example, they present the first few sentences of a document as an indication of the content of that document. These first few sentences may be extracted from the document and stored as a summary of that document for later use in response to a user query. While this technique works well with news stories that use the inverted pyramid style of writing, where the most important facts are mentioned toward the beginning of the article, it does not work well with other text genres that typically do not use the inverted pyramid style.

As a result of the current state of the art, after results pages for a user query are displayed, the user may have to undertake the laborious process of visiting each website listed on the search results pages to determine whether the document listed is relevant. Many users do not have the time or patience to do this. Moreover, a user who leaves the web catalog to examine the mentioned documents for relevancy is more likely to be distracted and not return to the catalog.

A web catalog's revenue generation is primarily dependent on advertisements and, more specifically, on the number of advertisement exposures per second. Since the web catalog generates revenue by exposing a user to advertising, the web catalog generates more revenue when the user remains on the web catalog site for as long of a time as possible. Thus, when a user leaves the catalog to examine the mentioned documents for relevancy and does not return to the web catalog, potential advertising revenues are lost.

A study by Tombros and Sanderson recently showed that query-biased summaries allow users to decide whether a document is relevant without having to read the document. Tombros, Anastasios and Sanderson, Mark, *Advantages of Query Biased Summaries in Information Retrieval*, Proceedings of the 21st Annual International ACM SIGIR Conference on Research and Development in Information Retrieval, Aug. 24–28, 1998, pages 2–10. In this study, users of a typical web catalog output referred to the full text of a document 23.7% of the time. In contrast, with query-biased summaries, users referred to a document only 1.37% of the time. These results led to the conclusion that a query-biased summary provided users with enough clues to judge a document's relevance to the query without the need to read the document itself.

Current web search engines do not provide query-biased document summaries for several reasons. The main reason is that computation time is extremely limited. Since revenue generation is dependent on advertising exposures, response time to a query is critical. Generating query-biased summaries as part of the retrieval process would add enough of a delay to decrease the revenue throughput of the web catalog. The added delay might additionally cause some users to switch to a competitor's faster web catalog. Moreover, web catalogs answer tens of millions of queries per day, and adding a second or two of computation time per query might necessitate the purchase of additional equipment to handle the increased demands on the system.

Since the state of the art for query-biased summarization requires that the full text of the document be available, legal restrictions may prevent web catalogs from producing query-relevant summaries at search time. Current copyright law may restrict the ability of web catalogs to maintain a copy of the full text of a document. Today, practitioners in the field generally believe that copyright law permits web catalogs to store only short excerpts of a document, not the entire document itself. It is also generally believed that web catalogs may retrieve a document's full text in order to index it, so long as the full text is discarded after generation of the index.

Lastly, the size of the web has been estimated to be three terabytes in late 1998 and to be growing at a rate of approximately 35% per year. Storing the full text of every web page so that query-biased summaries can be generated at search time would require a great deal of disk space and may be prohibitive in cost.

SUMMARY OF THE INVENTION

It is an object of the present invention to provide a method and apparatus for rapidly producing document summaries and document browsing aids which do not require storing the full text of the documents.

Accordingly, we have developed a method and apparatus for rapidly producing document summaries and document browsing aids by, at index creation time, precomputing and caching query relevant information required for creating the summaries.

In the specification and claims, the words "cache" and "caching" mean to store data for reuse. For example, a disk cache is random-access memory that stores information retrieved from disk, keeping the most frequently accessed data in memory. Use of a disk cache saves time since it takes less time to retrieve information from memory than from disk. In this application, the word "cache" is used in a similar sense meaning that a precomputed summary or summaries are stored to avoid the need to compute them later when needed in response to a query.

In the specification and claims, the word "term" means single words, word n-grams, and/or phrases. An "n-gram" is a string of characters that may comprise all or part of a word.

The present invention avoids the problems in the current art by extracting topical information for each document at index time and caching either the key information required to generate the summary efficiently at search time or the topical summary. This substantially reduces the computation time and storage requirements and removes the necessity to retain entire documents for producing query-biased summaries. Thus, it becomes feasible for web catalogs and other information retrieval systems to provide topical summaries in the search results pages.

The present invention splits the summary generation process into two parts: one for index time and the other for search time. When the full text of a document is retrieved for indexing (or in an equivalent separate summarization process), the first part generates and stores query relevant information that will be used by the second part to produce or select summaries efficiently at search time.

Since computation time is not as critical at index creation time, the first part of the invention does not need to be particularly time efficient; however, the second part must be extremely time efficient. Caching the information for the summary at index creation time allows the web search engine to generate the summary at search time without requiring the full text of the document or a large amount of computation resources. Thus, the present invention shifts the least time efficient aspects of the summary generation process from the second part (at search time) to the first part (at index creation time) of the process. Shifting most of the computation time from search time to index creation time also reduces the total amount of computation time because the summary information need only be computed once instead of every time the document appears in search results for a user query.

Providing topical summaries will increase revenues by attracting more users to the catalog. Users will save time and have access to a more useful tool. Also, providing topical summaries will increase revenues by removing the need for current users to leave the catalog to examine a document in the search results for relevancy to the user query. Since users will remain at the web catalog instead of leaving it to visit other web pages, the number of advertising exposures per second is likely to increase.

The present invention can be adapted to any text summarization method involving text spans and to a variety of computation intensive document browsing aids. The invention significantly reduces the time it takes to produce a query-biased summary without substantially affecting the quality of the summary. Thus, the invention makes it feasible for web search engines and other information retrieval systems to display document summaries and other document browsing aids with the results of a search.

While the present invention is advantageous for use with web search engines, it also applies to other information retrieval systems where a short response time is critical. For example, the invention can apply to an application that indexes a user's personal files or archives of e-mail messages where it is more important for the system to run quickly when the user executes a search than when the documents are initially indexed. Likewise, any product that includes a document index, for example, an encyclopedia or an archive of news articles, can be shipped with the cached summary information. Thus, the consumer would be provided with a fast and efficient user interface.

The present invention also applies to document browsing aids, such as keyword gists, thumbnail images, clustering, and categories. A keyword gist is a shortened form of a document in which all but the keywords have been deleted. A thumbnail is a reduced image of the document (e.g., a photo reduction). Clustering involves grouping related documents together into a cluster. Categorizing is similar to clustering, but instead assigns a label to each document in which the label identifies which group that document belongs. By optimizing the search time generation of these aids through the precomputing and caching of information, the present invention makes these aids practical for real world applications, such as web catalogs and document indexes.

An apparatus of the present invention utilizes any computer-assisted system including hardware and/or software for processing data which is capable of storing and executing the methods according to the present invention. The apparatus also is capable of storing documents or accessing stored documents. The apparatus may include a client system, a server system, communications links, and a network. In such an apparatus, the communications links are utilized to establish communication channels across the network and between the client and server systems.

DESCRIPTION OF THE PREFERRED EMBODIMENTS

Figure 1:
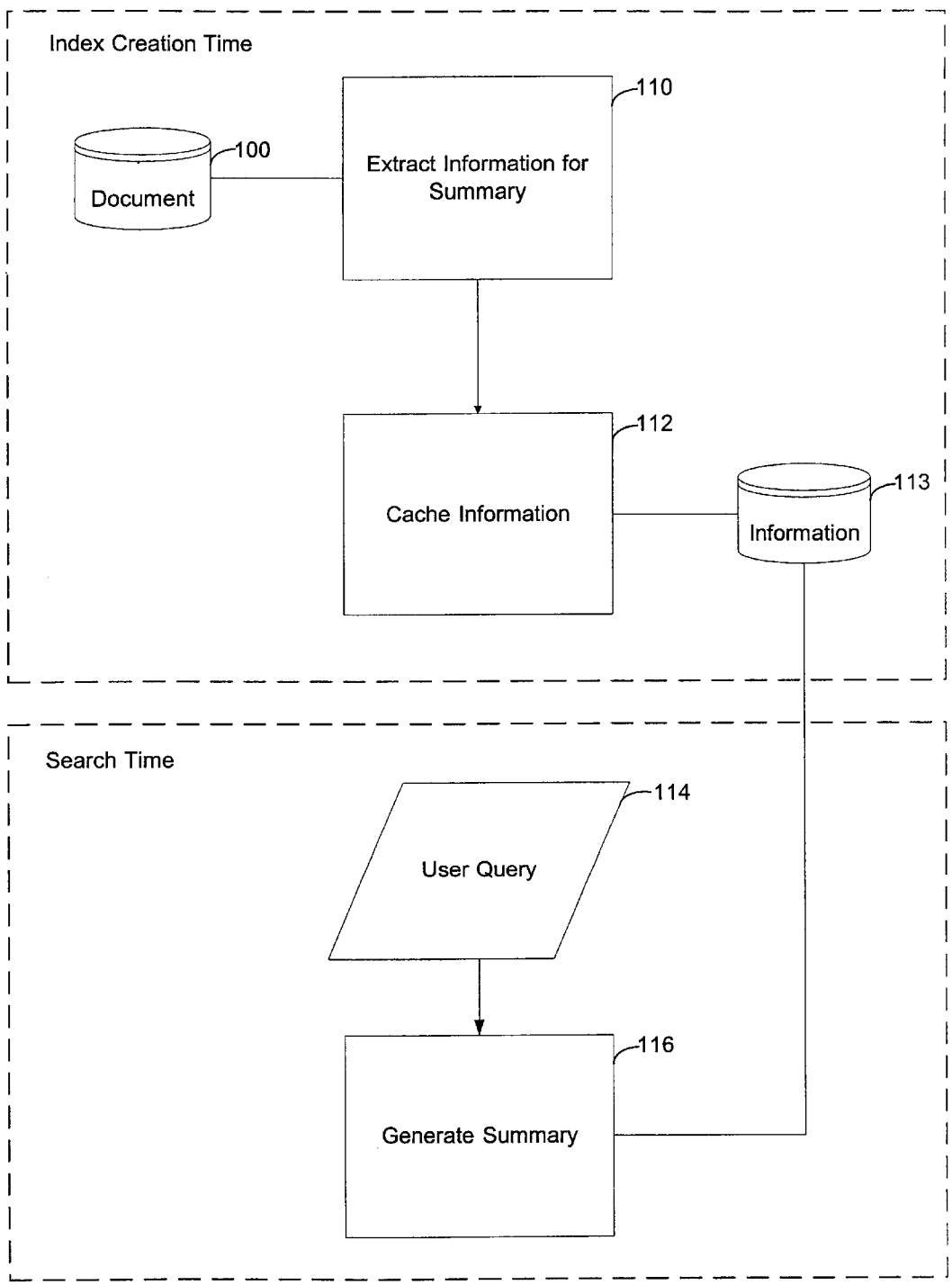
FIG. 1 is a flow diagram of a first embodiment of a method according to the present invention.

Referring to FIG. 1, a first embodiment of a method according to the present invention begins at index creation time with step 110 by extracting information from a document 100. The extracted information is information that is relevant to at least one dummy query and is necessary to compile at least one temporary summary for the document 100. In step 112, information 113 is cached for later use in creating a summary of the document 100. At search time, a user query is entered at step 114, and step 116 generates the summary for the document 100 by utilizing the cached information 113.

Dummy queries are constructed to resemble the most probable user queries that would be relevant to the document being summarized. The dummy query may include terms most likely to be contained in a user query searching for the document 100. The dummy query may include terms that frequently appear in the document 100 after stop words are removed. The frequency of the terms may be obtained from document frequency statistics. Likewise, the dummy query may include terms in a term vector or a passage term vector (i.e., a term vector for a passage of a document) of the document 100. The dummy query may also include terms that are synonyms of the terms in the term vector. The dummy query may contain terms that appear frequently in documents in a top ranked documents list resulting from a user query containing the terms of the term vector. Likewise, the dummy query may include terms that are in both the document 100 and prior user queries. The prior user queries may be those in which the document 100 appeared in a top ranked documents list.

Step 110 may utilize an information extraction algorithm that extracts specific information. For example, the information may be the title of the document, the author's name, the time and date of an event, certain sentences, or a summary or an abstract coded into the document 100.

Whole sentences may be extracted. In order to aid in the decision of which sentences to extract, a score may be assigned to each sentence of the document 100. For example, step 110 may extract at least the highest scoring sentence, or may extract a pre-defined number of the highest scoring sentences. Step 110 may extract the highest scoring sentences that have a score greater than a threshold score. Up to a pre-defined number of the highest scoring sentences having a score greater than a threshold may be extracted. Likewise, step 110 may extract all of the sentences of a paragraph that contain a number of the highest scoring sentences. Furthermore, each score may be assigned based upon the similarity of the sentence to sentences of documents in a results document list created by the dummy query.

Step 112 may cache the extracted information 113 in an inverted document index with a document pointer and document attributes. Likewise, the information 113 may be cached in a query table.

At search time, if a paragraph was extracted in step 110, the summary generated in step 116 may be the paragraph that was extracted.

Figure 2:
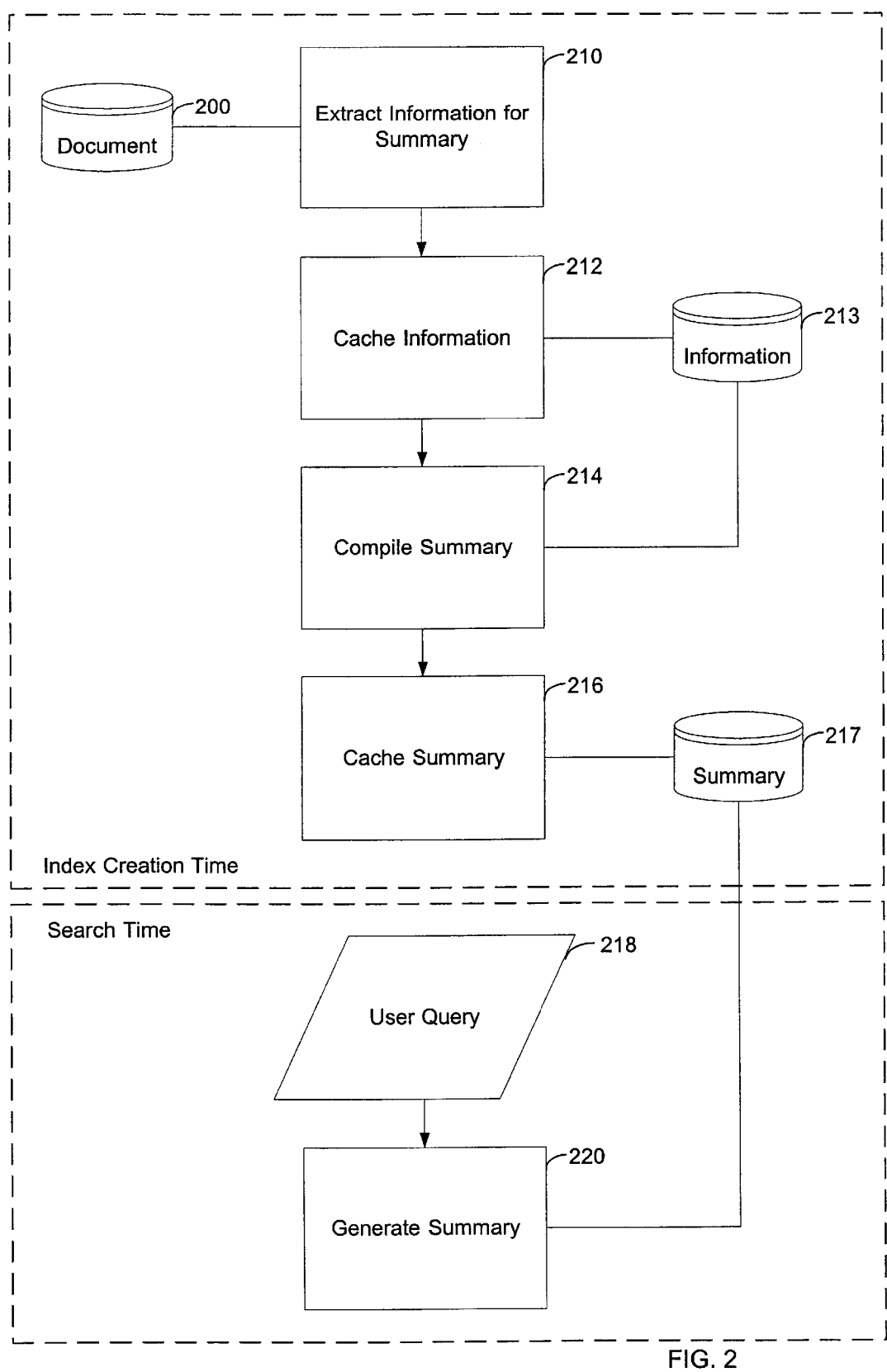
FIG. 2 is a flow diagram of a second embodiment of a method according to the present invention.

A second embodiment of a method of the present invention is shown in FIG. 2. At index creation time, information from a document 200 which is relevant to at least one dummy query and is necessary to compile at least one temporary summary is extracted in step 210. Step 212 caches information 213. Step 214 compiles a summary of the document 200. Summary 217 is cached in step 216. At search time, a user query is entered at step 218. The cached summary 217 is utilized as the generated summary in step 220.

Figure 3:
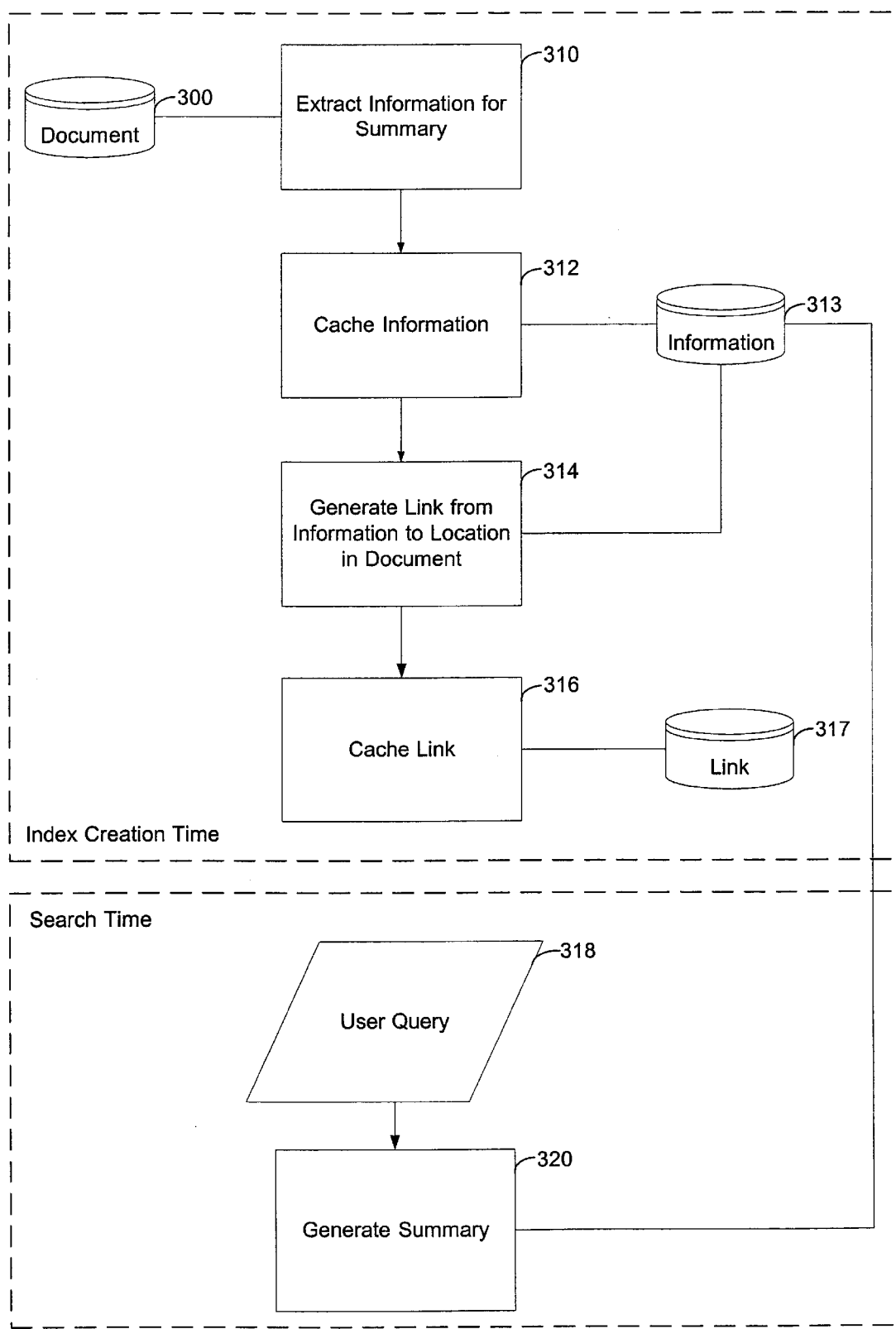
FIG. 3 is a flow diagram of a third embodiment of a method according to the present invention.

In a third embodiment of a method of the present invention, shown in FIG. 3, information from a document 300 that is relevant to at least one dummy query and is necessary to compile at least one temporary summary is extracted in step 310. Step 312 caches information 313. Step 314 generates links from the information 313 to the corresponding locations in the document 300 at which the information 313 is found. Step 316 caches links 317 that were generated in step 314. At search time, a user query is entered at step 318 and a summary of the document 300 is generated in step 318 using the information 313 cached in step 312. The links 317 may be provided with the summary to the user such that the user can jump directly to the relevant portions of the document 300.

Figure 4:
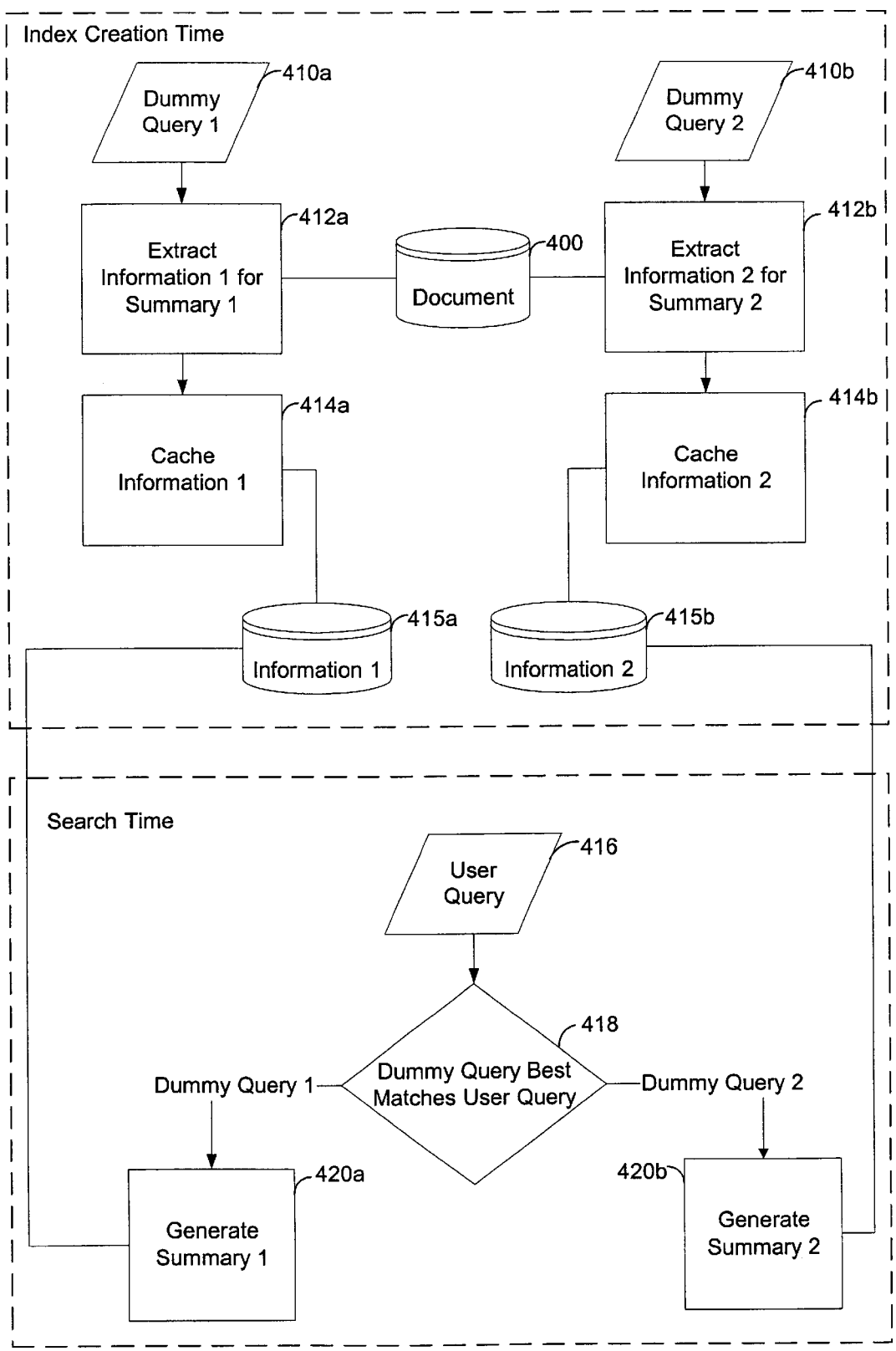
FIG. 4 is a flow diagram of a fourth embodiment of a method according to the present invention.

FIG. 4 illustrates a fourth embodiment of a method of the present invention. At index creation time, at least two dummy queries are entered in steps 410a and 410b for use in steps 412a and 412b to extract information from a document 400 that is relevant to at least one dummy query and is necessary to compile at least one temporary summary. Steps 414a and 414b separately cache the extracted information 415a and 415b, respectively. At search time, a user query is entered in step 416. Step 418 determines which dummy query best matches the user query. The dummy query that best matches the user query, as determined in step 418, determines whether step 420a or 420b generates the summary of the document 400 using the information 415a or 415b, respectively, cached in step 414a or 414b, respectively.

The information extracted in steps 412a and 412b may be a summary or abstract coded in the document or a set of results pages for each dummy query. The information may be extracted by assigning at least one score to each sentence in the document according to the relevance of the sentence to the at least one dummy query and extracting at least the highest scoring sentence.

Steps 414a and 414b may also cache a label with the information 615a and 615b. Each label may consist of the terms of the corresponding dummy query. At search time, step 418 determines which dummy query label best matches the user query. Steps 420a or 420b generates the summary using the information 415a or 415b, respectively, depending upon which label was deemed to best match the user query in step 418. Steps 412a and 412b may also generate a summary for each dummy query from the information extracted. Each summary is separately cached with the extracted information in steps 414a and 414b. At search time, step 420a or 420b generates the summary using the summary cached in 414a or 414b, respectively.

Figure 5:
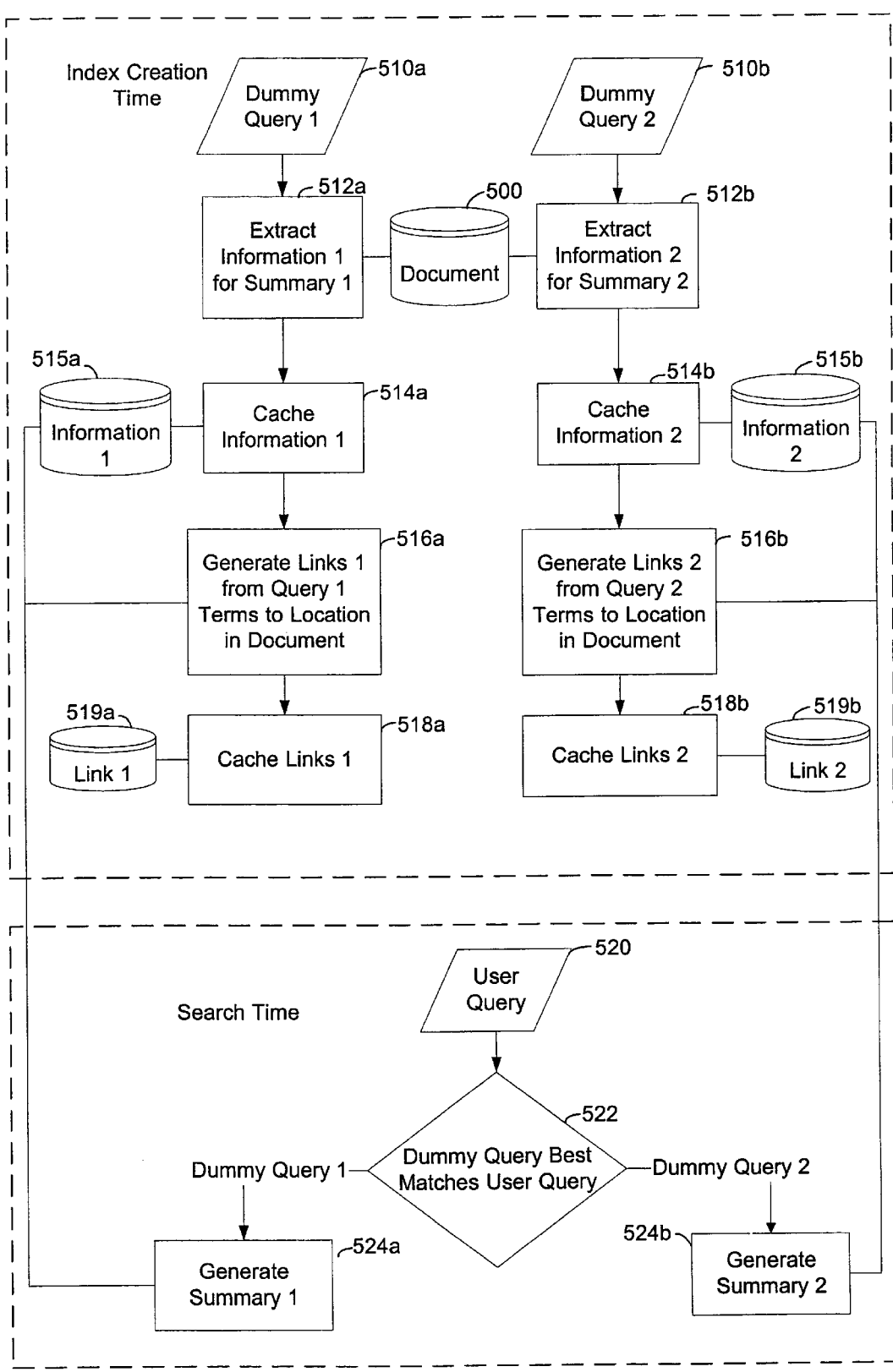
FIG. 5 is a flow diagram of a fifth embodiment of a method according to the present invention.

FIG. 5 shows a fifth embodiment of the present invention wherein dummy queries are utilized as in FIG. 4. At index creation time, dummy queries are entered in steps 510a and 510b for use in steps 512a and 512b to extract information from a document 500 that is relevant to at least one dummy query and necessary for compiling at least one temporary summary. Steps 514a and 514b separately cache extracted information 515a and 515b. However, once the information 515a and 515b is cached in steps 514a and 514b, steps 516a and 516b generate links from the query terms to the locations in the document 500 at which the query terms are found. Steps 518a and 518b cache links 519a and 519b generated in steps 516a and 516b, respectively. At search time, a user query is entered in step 520. Step 522 determines which dummy query best matches the user query. The dummy query that best matches the user query determines whether step 524a or 524b generates the summary of the document 500 using the information 515a or 515b, respectively, cached in step 514a or 514b, respectively. The links 519a and 519b may be provided to the user such that the user can jump directly to the relevant portions of the document 500.

Figure 6:
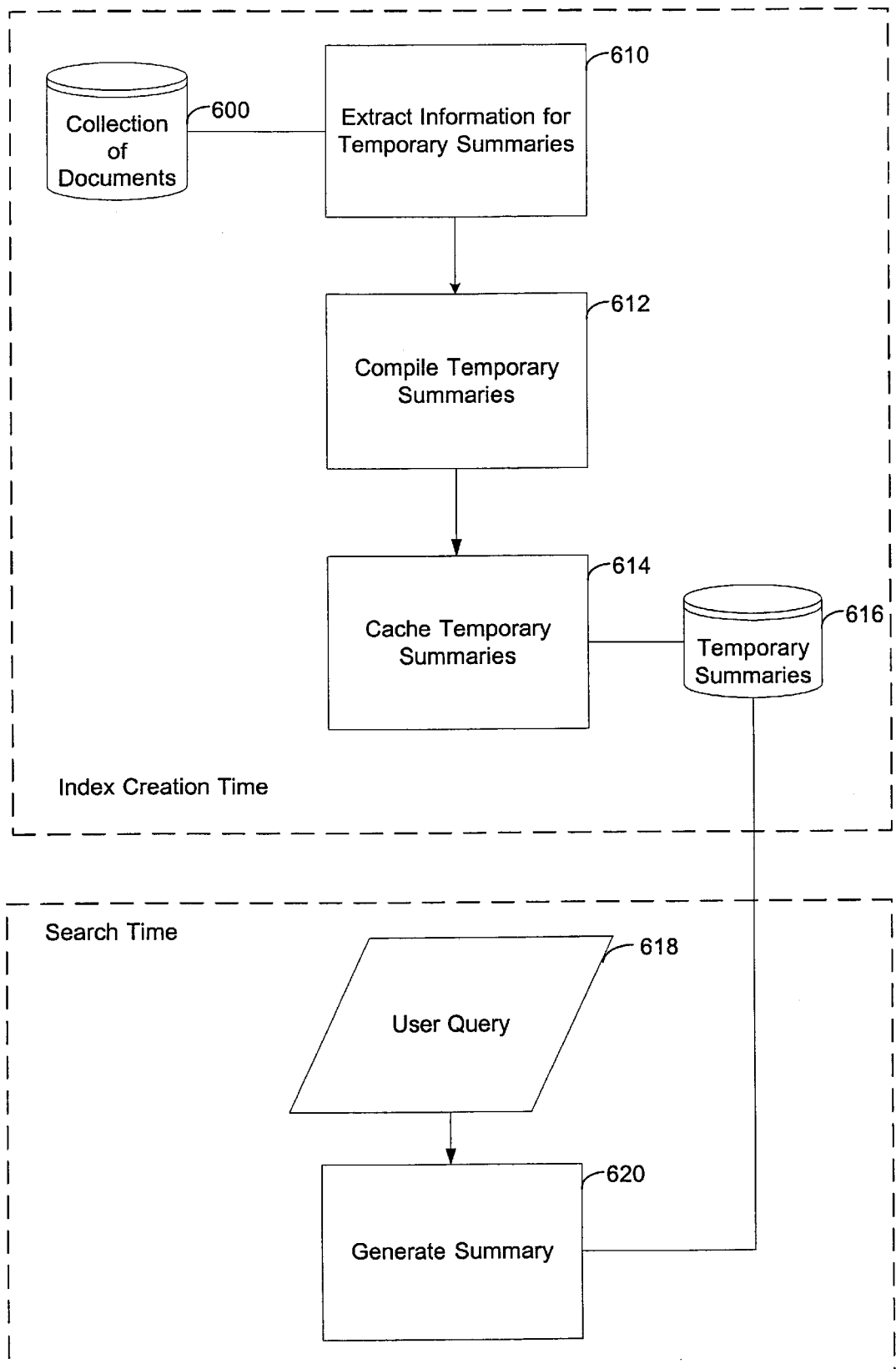
FIG. 6 is a flow diagram of a sixth embodiment of a method according to the present invention.

FIG. 6 shows a sixth embodiment of a method of the present invention. At index creation time, for one or more documents of a collection of documents 600, step 610 extracts information that is relevant to at least one dummy query and is necessary to compile one or more temporary summaries for each of the one or more documents. Step 612 compiles the one or more temporary summaries, and step 614 caches the one or more summaries. At search time, a user query is entered in step 618. Step 620 generates a summary for one or all of the documents in the collection 600 using the cached one or more temporary summaries 616.

Figure 7:
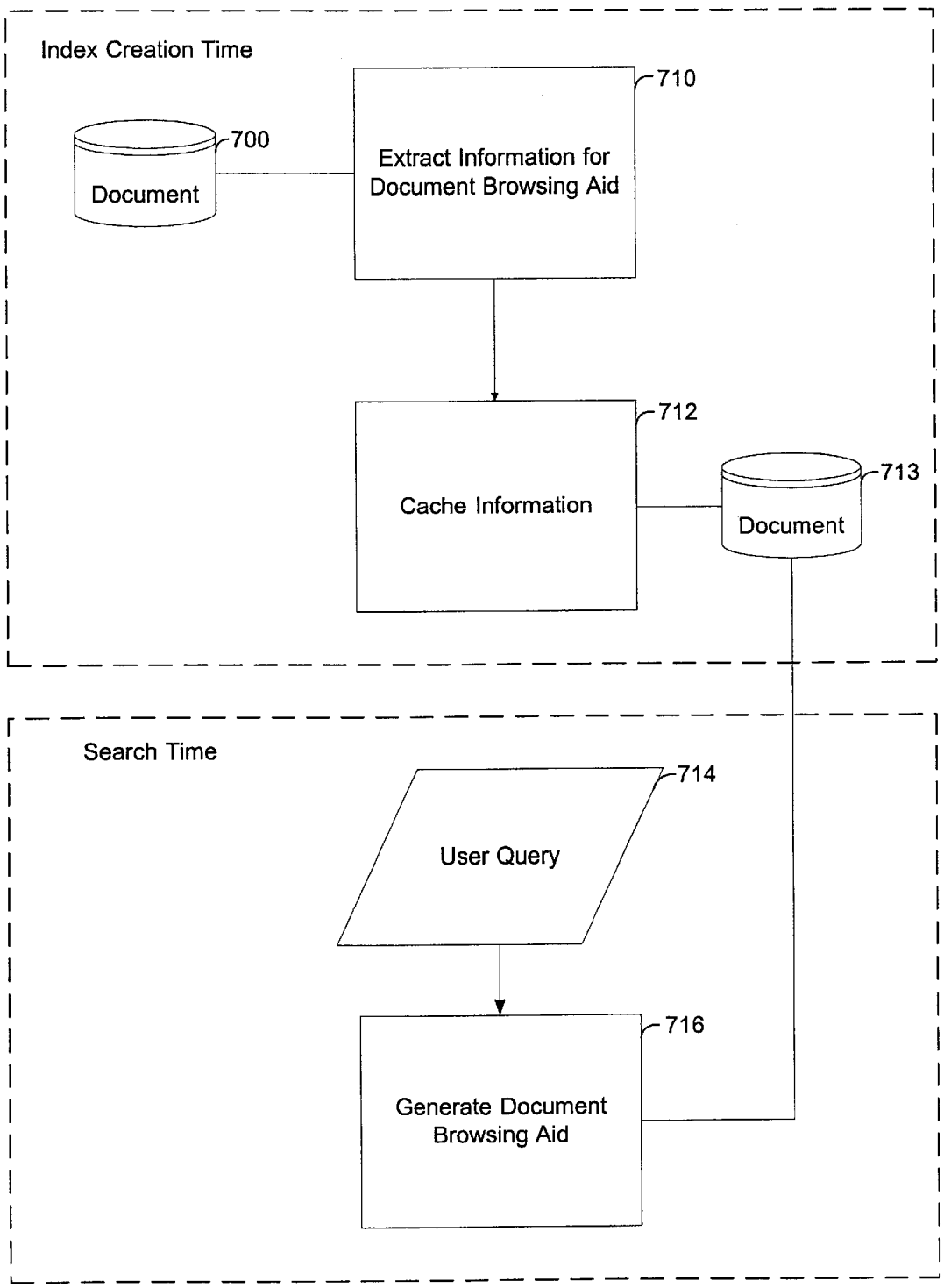
FIG. 7 is a flow diagram of a seventh embodiment of a method according to the present invention.

FIG. 7 shows a seventh embodiment of a method of the present invention. At index creation time step 710 extracts information from a document 700 that is relevant to at least one dummy query and is necessary to compile one or more temporary summaries in order for a document browsing aid to be generated at search time. Information 713 is cached in step 712. At search time, a user query is entered in step 714. Step 716 generates a document browsing aid using the cached information 713 in step 712.

Figure 8:
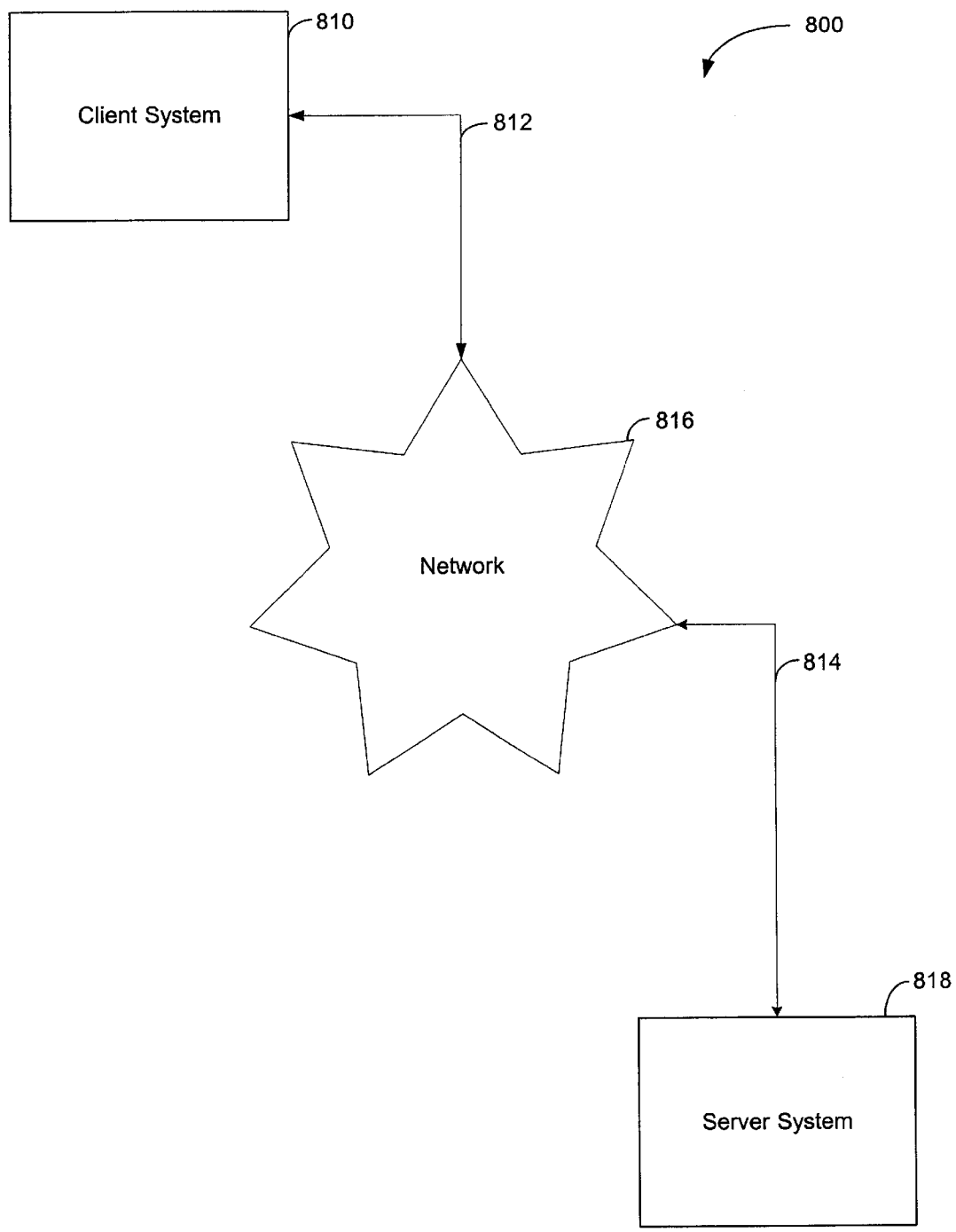
FIG. 8 is an illustration of an apparatus according to the present invention.

FIG. 8 shows an embodiment of an apparatus 800 capable of enabling the methods according to the present invention. The apparatus 800 includes a client system 810, communications links 812 and 814, a network 816, and a server system 818. The client system 810 may be any apparatus including hardware and/or software for processing data. The server system 818 may be any apparatus including hardware and/or software for processing data. The communications links 812 and 814 may be any channels of communication. The network 816 may be any network, for example, the Internet.

The client system 810 is coupled to the network 816 by the communications link 812. The server system 818 is coupled to the network 816 by the communications link 814.

In use, a document is stored on the server system 818. The document may be stored at a location other than the server system 818 as long as the server system 818 has the ability to access and retrieve information from the document. At index time, a method according to the present invention executes on the server system 818 to precompute and cache the information that is relevant to at least one dummy query and is required for creating a summary of or a document browsing aid for the document at search time. At search time, a user enters a user query on the client system 810. The communications links 812 and 814 relay this query across the network 816 to the server system 818. The method then generates the summary or document browsing aid in response to the user query and sends the results back to the client system 810 over the network 816 using the communications links 812 and 814.

While a client/server system is described, any computer-assisted apparatus may be utilized as long as the system is capable of storing and executing the methods according to the present invention.

The present invention permits document summaries and browsing aids to be rapidly produced by precomputing and caching query relevant information from a document at index creation time such that a summary or document browsing aid can be created at search time in a time-efficient manner from the cached information. By using the cached query relevant information at search time, the present invention also eliminates the need to have access to the entire document at search time in order to produce the summary or browsing aid.

It will be understood by those skilled in the art that while the foregoing description sets forth in detail preferred embodiments of the present invention, modifications, additions, and changes may be made thereto without departing from the spirit and scope of the invention. Having thus described our invention with the detail and particularity required by the Patent Laws, what is desired to be protected by Letters Patent is set forth in the following claims.

We claim:

1. A computer-assisted method for generating a summary of a document, comprising the steps of:
   at an index creation time,
      with access to the entire document extracting from the document information that is relevant to at least one dummy query and is necessary to compile at least one temporary summary, and
      caching at least part of the information comprising substantially less than the entire document; and
   at a later search time,
      generating the summary from the information cached.

2. The computer-assisted method according to claim 1, wherein the dummy query includes terms most likely to be contained in a user query searching for the document.

3. The computer-assisted method according to claim 1, wherein the dummy query includes terms that appear frequently in the document after stop words are removed.

4. The computer-assisted method according to claim 1, wherein the dummy query includes terms in a passage term vector of the document.

5. The computer-assisted method according to claim 1, wherein the dummy query includes terms in a term vector of the document.

6. The computer-assisted method according to claim 5, wherein the dummy query also includes terms that are synonyms of the terms in the term vector of the document.

7. The computer-assisted method according to claim 5, wherein the dummy query also includes terms that appear frequently in documents in a top ranked documents list resulting from a user query containing the terms in the term vector.

8. The computer-assisted method according to claim 1, wherein the dummy query includes terms that are in both the document and prior user queries.

9. The computer-assisted method according to claim 8, wherein the prior user queries result in the document appearing in a top ranked documents list.

10. The computer-assisted method according to claim 1, wherein the information is extracted using an information extraction algorithm that extracts specific information.

11. The computer-assisted method according to claim 10, wherein the information extraction algorithm extracts the summary or abstract coded in the document.

12. The computer-assisted method according to claim 1, wherein the information extracted is text spans.

13. The computer-assisted method according to claim 12, wherein the text spans are sentences.

14. The computer-assisted method according to claim 13, wherein:
   the information is extracted by the step of assigning at least one score to each sentence in the document according to the relevance of the sentence to the at least one dummy query,
   wherein at least the highest scoring sentence is extracted.

15. The computer-assisted method according to claim 14, wherein a pre-defined number of the highest scoring sentences are extracted.

16. The computer-assisted method according to claim 14, wherein the highest scoring sentences that have a score greater than a threshold are extracted.

17. The computer-assisted method according to claim 16, wherein up to a pre-defined number of the highest scoring sentences is extracted.

18. The computer-assisted method according to claim 14, wherein:
   the information is extracted by the steps of:
      assigning at least one score to each sentence in the document according to the relevance of the sentence to the at least one dummy query, and
      extracting all of the sentences of a paragraph of the document which contains a number of the highest scoring sentences, and
   the summary generated is the paragraph.

19. The computer-assisted method according to claim 14, wherein the score assigned to each sentence is based upon the similarity of the sentence to sentences of documents in a results document list created by execution of the at least one dummy query, and the dummy query contains terms most likely to be contained in a user query searching for the document.

20. The computer-assisted method according to claim 1, wherein the cached information is stored in an inverted document index with a document pointer and document attributes.

21. The computer-assisted method according to claim 1, wherein the cached information is stored in a query table.

22. The computer-assisted method according to claim 1, further including the steps of:
   at index creation time,
      compiling the at least one temporary summary from the extracted information, and
      caching the at least one temporary summary as part of the information cached,
   wherein the summary generated is one of the at least one temporary summaries.

23. The computer-assisted method according to claim 1, further including the steps of:
   generating a link that associates the information with at least one position within the document to which the information relates; and
   caching the link.

24. The computer-assisted method according to claim 1, wherein:
   the information extracted is relevant to at least two dummy queries each made up of at least one term and is separately cached for each dummy query, and
   the summary is generated from the information cached for the dummy query that substantially matches a user query having at least one term.

25. The computer-assisted method according to claim 24, wherein the information extracted is a summary or abstract coded in the document.

26. The computer-assisted method according to claim 24, wherein the information extracted is a set of results pages for each dummy query.

27. The computer-assisted method according to claim 24, wherein:
   the information is extracted by steps of assigning at least one score to each sentence in the document according to the relevance of the sentence to the at least one dummy query, and
   wherein at least the highest scoring sentence is extracted.

28. The computer-assisted method according to claim 24, wherein:
   the information extracted includes a label consisting of each term of the corresponding dummy query; and
   the summary generated consists of the sentences associated with the dummy query in which the terms of the label substantially match terms of the user query.

29. The computer-assisted method according to claim 24, wherein:
   the information cached includes one document summary generated from the information extracted for each of the at least two dummy queries, and a label consisting of each term of the corresponding dummy query, and
   the summary generated consists of the document summary associated with the dummy query in which the terms of the label substantially match the terms of the user query.

30. The computer-assisted method according to claim 24, wherein the information is sentences, and the computer-assisted method further includes the steps of:
   generating links that associate the dummy query terms with the locations in the documents of the sentences that contain the terms; and
   caching the links.

31. A computer-assisted method for generating a summary of a collection of documents, comprising the steps of:
   at an index creation time,
      for one or more documents in the collection of documents with access to the entire document, extracting information that is relevant to at least one dummy query and is necessary to compile one or more temporary summaries for each of the one or more documents,
      compiling the one or more temporary summaries comprising substantially less than the entire document from the extracted information,
      caching the one or more temporary summaries; and
   at a later search time,
      generating the summary for the collection of documents from the cached one or more temporary summaries.

32. A computer-assisted method for generating a query-biased document browsing aid, comprising the steps of:
   at an index time,
      with access to the entire document extracting information that is relevant to at least one dummy query and is necessary to compile the browsing aid from the document;
      caching at least part of the information comprising substantially less than the entire document; and
   at a later search time,
      generating the browsing aid from the information cached.

33. The computer-assisted method according to claim 32, wherein the query-biased document browsing aid is a keyword gist.

34. The computer-assisted method according to claim 32, wherein the query-biased document browsing aid is a thumbnail image.

35. The computer-assisted method according to claim 32, wherein the query-biased document browsing aid is clustering.

36. The computer-assisted method according to claim 32, wherein the query-biased document browsing aid is categories.

37. An apparatus to enable a method for generating a summary of at least one document, comprising:
   a means for extracting information from an entire document that is relevant to at least one dummy query and is necessary to compile at least one temporary summary from the at least one document at an index creation time;
   a means for caching at least part of the information comprising substantially less than the entire document at an index creation time; and
   a means for generating the summary from the information cached at a search time.

* * * * *